US012643474B2

(12) United States Patent
Ichikawa et al.

(10) Patent No.: US 12,643,474 B2
(45) Date of Patent: *Jun. 2, 2026

(54) IMAGE DISPLAY SYSTEM

(71) Applicants: KABUSHIKI KAISHA TOKAI-RIKA-DENKI-SEISAKUSHO, Aichi-ken (JP); SUZUKI MOTOR CORPORATION, Hamamatsu (JP)

(72) Inventors: Tomonori Ichikawa, Aichi (JP); Furuna Yamamoto, Aichi (JP); Toshinari Nakai, Aichi (JP); Takuya Kuriyama, Shizuoka (JP); Yuichi Nakajima, Shizuoka (JP)

(73) Assignees: KABUSHIKI KAISHA TOKAI-RIKA-DENKI-SEISAKUSHO, Aichi-ken (JP); SUZUKI MOTOR CORPORATION, Hamamatsu (JP)

( * ) Notice: Subject to any disclaimer, the term of this patent is extended or adjusted under 35 U.S.C. 154(b) by 55 days.

This patent is subject to a terminal disclaimer.

(21) Appl. No.: 18/390,146

(22) Filed: Dec. 20, 2023

(65) Prior Publication Data

US 2024/0208416 A1     Jun. 27, 2024

(30) Foreign Application Priority Data

Dec. 23, 2022     (JP) ................................. 2022-207660

(51) Int. Cl.
B60R 1/26 (2022.01)
B60R 1/04 (2006.01)
B60R 11/04 (2006.01)

(52) U.S. Cl.
CPC .................. B60R 1/26 (2022.01); B60R 1/04 (2013.01); B60R 11/04 (2013.01); *B60R 2300/202* (2013.01); *B60R 2300/802* (2013.01); *B60R 2300/8046* (2013.01)

(58) Field of Classification Search
None
See application file for complete search history.

(56) References Cited

U.S. PATENT DOCUMENTS

2004/0143373 A1 * 7/2004 Ennis ......................... B60R 1/28
701/1
2014/0347489 A1 * 11/2014 Kumon .................. B60K 35/00
348/148
2017/0163863 A1 * 6/2017 Gomez Timoneda .... B60R 1/26
(Continued)

FOREIGN PATENT DOCUMENTS

JP          2001105973          4/2001
JP          2008100596          5/2008

*Primary Examiner* — Rebecca A Volentine
(74) *Attorney, Agent, or Firm* — Dority & Manning, PA

(57) ABSTRACT

An image display system includes an image capture device that captures an image of an area behind a motorcycle; a display device that is disposed in front of a rider and displays an image based on image data obtained by the image capture device; and a control device which, when the motorcycle is travelling, controls the display device so as to display a first screen that displays a first image comprising a first area extracted from an imaging range of the image captured by the image capture device and, thereafter, transition from the first screen to a second screen that displays a second image comprising a second area, wider than the first area, extracted from the imaging range.

12 Claims, 24 Drawing Sheets

(56) References Cited

U.S. PATENT DOCUMENTS

2020/0067786 A1\*   2/2020   Ricci ..................... B60W 40/04
2021/0099662 A1\*   4/2021   Arakawa .................. G09G 5/14
2023/0409268 A1\*  12/2023   Choi ....................... G06F 3/147

\* cited by examiner

CONTROL DEVICE

SWITCH DETERMINATION UNIT — 50

DISPLAY CONTROL UNIT — 52

FIG.5

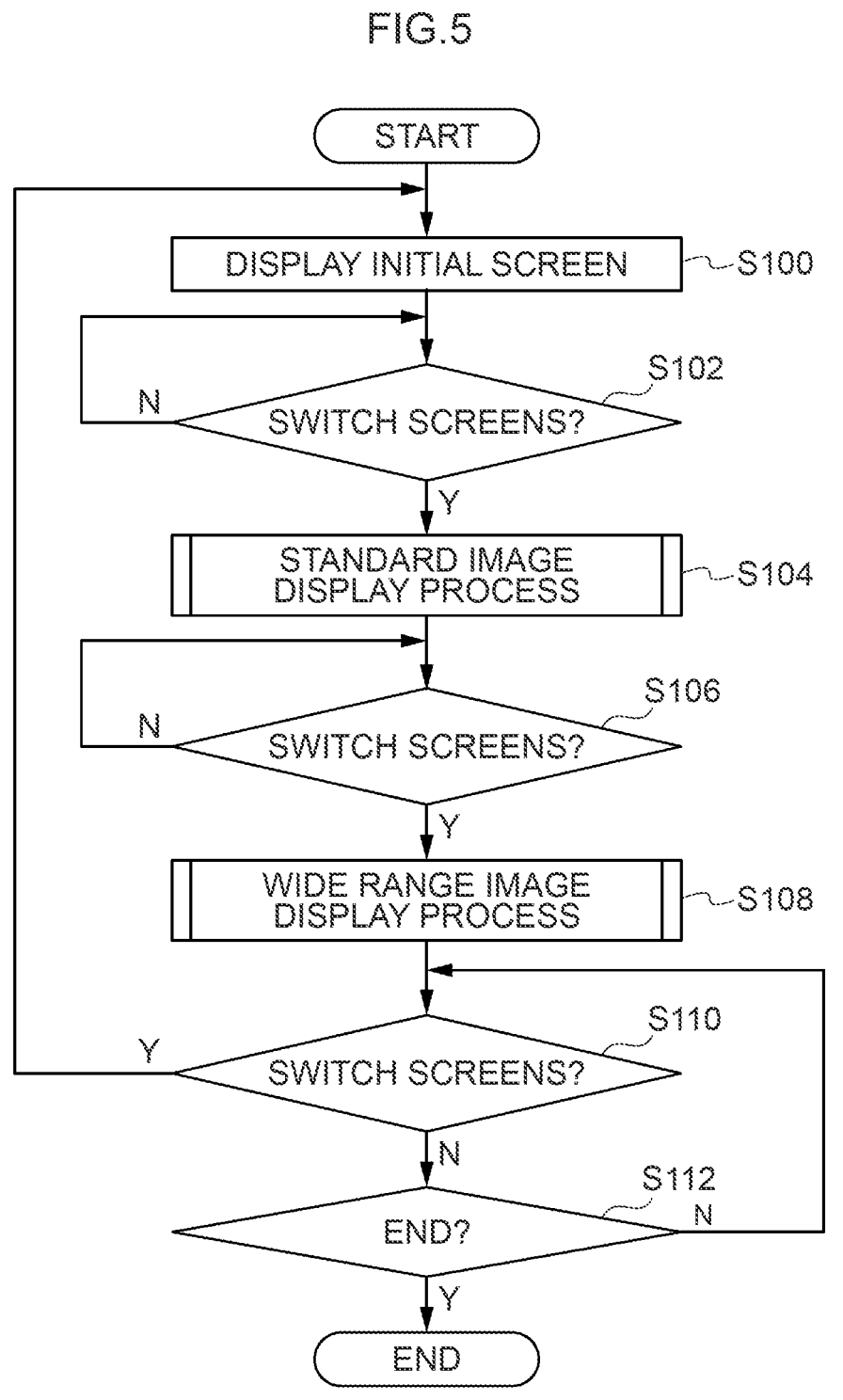

```
                    ┌──────────┐
                    │  START   │
                    └────┬─────┘
                         │
      ┌──────────────────▼──────────────────┐
      │       DISPLAY INITIAL SCREEN        │──── S100
      └─────────────────┬───────────────────┘
                        │
          ┌─────────────▼─────────────┐
          │                           │
    N  ◄──┤      SWITCH SCREENS?      │──── S102
          │                           │
          └─────────────┬─────────────┘
                        │ Y
      ┌─────────────────▼─────────────────┐
      │         STANDARD IMAGE            │──── S104
      │        DISPLAY PROCESS            │
      └─────────────────┬─────────────────┘
                        │
          ┌─────────────▼─────────────┐
          │                           │
    N  ◄──┤      SWITCH SCREENS?      │──── S106
          │                           │
          └─────────────┬─────────────┘
                        │ Y
      ┌─────────────────▼─────────────────┐
      │        WIDE RANGE IMAGE           │──── S108
      │        DISPLAY PROCESS            │
      └─────────────────┬─────────────────┘
                        │
          ┌─────────────▼─────────────┐
    Y  ◄──┤      SWITCH SCREENS?      │──── S110
          └─────────────┬─────────────┘
                        │ N
          ┌─────────────▼─────────────┐
          │           END?            │──── S112   N
          └─────────────┬─────────────┘
                        │ Y
                    ┌───▼──────┐
                    │   END    │
                    └──────────┘
```

Figure 12:
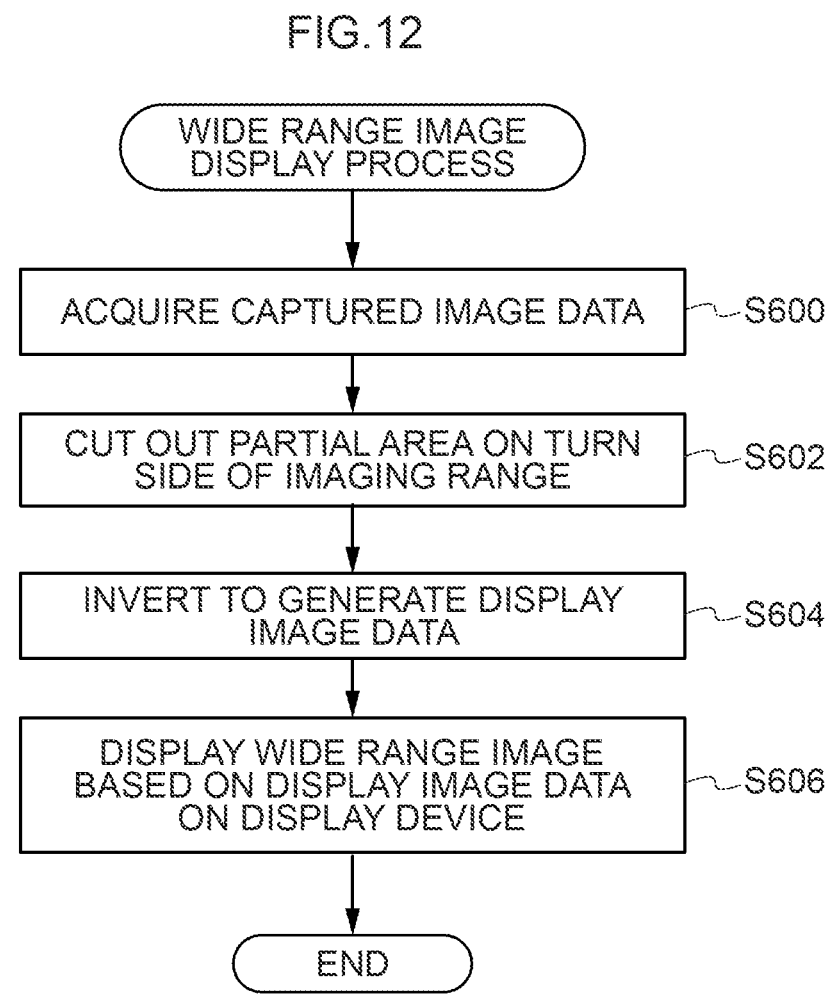

WIDE RANGE IMAGE
DISPLAY PROCESS

ACQUIRE CAPTURED IMAGE DATA          ~S600

CUT OUT PARTIAL AREA ON TURN
SIDE OF IMAGING RANGE          ~S602

INVERT TO GENERATE DISPLAY
IMAGE DATA          ~S604

DISPLAY WIDE RANGE IMAGE
BASED ON DISPLAY IMAGE DATA
ON DISPLAY DEVICE          ~S606

END

IMAGE DISPLAY SYSTEM

CROSS-REFERENCE TO RELATED APPLICATION

This application claims priority under 35 USC 119 from Japanese Patent Application No. 2022-207660, filed on Dec. 23, 2022, the entire disclosure of which is incorporated herein by reference.

BACKGROUND

Technical Field

The present disclosure relates to an image display system.

Related Art

Conventionally, technologies are known where a rear view image capturing the area behind a two-wheeled vehicle is displayed on a display device to provide visual information about the area behind the two-wheeled vehicle to the rider. According to image capture devices including a wide-angle lens, a wide range area behind the two-wheeled vehicle can be captured, but when a rear view image capturing the wide range area is displayed on the display device, there is the problem of reduced visibility because the size of the following vehicle in the image is small.

To address this problem, Japanese Patent Application Laid-open (JP-A) No. 2008-100596 discloses a technology where a predetermined area is cut out from a rear view image including a wide range area, and an image of the predetermined area is displayed in an image size with which the rider may easily identify the predetermined area. Furthermore, JP-A No. 2001-105973 discloses a technology that allows the field of view of an image to be enlarged or reduced.

However, there are cases where the rider wants to check a wide range area when changing lanes or making a right or left turn. At the same time, however, as has conventionally been pointed out, if the size of the following vehicle appearing on the display device is small, there is the problem that it becomes difficult for the rider to grasp a sense of the distance between the host vehicle and the following vehicle. Furthermore, suddenly changing the size of the following vehicle results in the rider no longer grasping a sense of the distance to the following vehicle.

SUMMARY

It is an object of the present disclosure to provide an image display system that can display a rear view image viewing a wide range area while maintaining a sense of the distance to a following vehicle and a sense of the size of the following vehicle. The "image" in this disclosure include video and stationary image.

An image display system of a first aspect of the disclosure includes: an image capture device that captures an image of an area behind a motorcycle; a display device that is disposed in front of a rider and displays an image based on image data obtained by the image capture device; and a control device which, when the motorcycle is travelling, controls the display device so as to display a first screen that displays a first image comprising a first area extracted from an imaging range of the image captured by the image capture device and, thereafter, transition from the first screen to a second screen that displays a second image comprising a second area, wider than the first area, extracted from the imaging range.

An image display system of a second aspect of the disclosure is the image display system of the first aspect of the disclosure, wherein a first magnification at which the first image is displayed is closer to a magnification of a rearview optical mirror than a second magnification at which the second image is displayed.

An image display system of a third aspect of the disclosure is the image display system of the first aspect or the second aspect of the disclosure, wherein the control device controls the display device so as to display an initial screen and, thereafter, transition from the initial screen to the first screen, and controls the display device so as to transition from the second screen to the initial screen.

An image display system of a fourth aspect of the disclosure is the image display system of the third aspect of the disclosure, further including an operation device that receives an instruction to switch screens from the rider, wherein the control device controls the display device such that at least one of a transition from the initial screen to the first screen, a transition from the first screen to the second screen, and a transition from the second screen to the initial screen is effected in response to an instruction from the rider via the operation device.

An image display system of a fifth aspect of the disclosure is the image display system of the fourth aspect of the disclosure, wherein the operation device is a switch configured to be subjected to long pressing, and the control device controls the display device such that a transition from the initial screen to the first screen and a transition from the first screen to the second screen are continuously effected in response to a long pressing operation of the switch.

An image display system of a sixth aspect of the disclosure is the image display system of the fourth aspect of the disclosure, wherein the operation device is a switch that instructs switching to the second screen, and the control device controls the display device such that a transition from the initial screen to the first screen and a transition from the first screen to the second screen are continuously effected in response to an operation of the switch.

An image display system of a seventh aspect of the disclosure is the image display system of the third aspect of the disclosure, wherein the control device controls the display device such that at least one of a transition from the initial screen to the first screen or a transition from the first screen to the second screen is effected in conjunction with an operation of a turn switch installed in the motorcycle.

An image display system of an eighth aspect of the disclosure is the image display system of the seventh aspect of the disclosure, wherein the second area has a range that is wider on a turn side than the first area.

An image display system of a ninth aspect of the disclosure is the image display system of the seventh aspect of the disclosure, wherein the control device controls the display device such that a transition from the initial screen to the first screen and a transition from the first screen to the second screen are continuously effected in response to a long pressing operation of the turn switch.

An image display system of a tenth aspect of the disclosure is the image display system of the seventh aspect of the disclosure, wherein the control device controls the display device such that a transition from the initial screen to the first screen and a transition from the first screen to the second screen are continuously effected in conjunction with a one-time operation of the turn switch.

An image display system of an eleventh aspect of the disclosure is the image display system of the first aspect of the disclosure, wherein the control device controls the display device so as to transition from the first screen to the second screen via at least one third screen, which displays a third image comprising a third area, which is wider than the first area and narrower than the second area, extracted (i.e. cut out) from the imaging range of the image captured by the image capture device, wherein during the transition from the first screen to the second screen, the magnification of the image displayed on each screen is gradually increased such that the first image continuously changes to the second image.

A control device for controlling a display device so as to display images obtained by an image capture device that captures an image of an area behind a motorcycle, the device comprising a memory and a processor coupled to the memory, the processor being configured to: display a first screen that displays a first image comprising a first area extracted from an imaging range of the image captured by the image capture device, and effect transition of a display screen of the display device from the first screen to a second screen that displays a second image comprising a second area, wider than the first area, extracted from the imaging range.

According to the image display system of the first aspect of the disclosure and the control device of the twelfth aspect of the disclosure, a rear image corresponding to a narrow area of the imaging range (i.e., the first image) is displayed and thereafter a rear image corresponding to a wider range area of the imaging range (i.e., the second image) is displayed, so a rear image including a wide range area (i.e., the second image) can be displayed while maintaining a sense of the distance to a following vehicle and a sense of the size of the following vehicle.

According to the image display system of the second aspect of the disclosure, it becomes easy for the rider to grasp a sense of the distance to the following vehicle and a sense of the size of the following vehicle.

According to the image display system of the third aspect of the disclosure, the initial screen is displayed when the image display system does not display image, so annoyance when the rider is looking forward can be reduced.

According to the image display system of the fourth aspect of the disclosure, by operating the operation device, a rear image (e.g., the first image and the second image) can be displayed just when the rider wants to look at the rear image.

According to the image display system of the fifth aspect of the disclosure, the number of times that the rider performs an operation can be reduced.

According to the image display system of the sixth aspect of the disclosure, maintaining a sense of the distance to the following vehicle and a sense of the size of the following vehicle is assured.

According to the image display system of the seventh aspect of the disclosure, the screen is automatically switched in response to situations such as changing course and making a right or left turn, so the number of times that the rider performs switch operations can be reduced.

According to the image display system of the eighth aspect of the disclosure, the rider can look at a image of the rear area on the turn side that the rider wants to check when changing course or making a right or left turn.

According to the image display system of the ninth aspect and the tenth aspect of the disclosure, the number of times that the rider performs an operation can be reduced.

According to the image display system of the eleventh aspect of the disclosure, it becomes easy for the rider to perceive changes in the image, and it becomes easy to maintain a sense of the distance to the following vehicle and a sense of the size of the following vehicle.

BRIEF DESCRIPTION OF THE DRAWINGS

The foregoing and other objects, features, and advantages of the disclosure will become more apparent from the following detailed description considered together with the accompanying drawings, in which:

FIG. 4 is a functional block diagram showing an example of functional configurations of a control device according to the first embodiment of the disclosure;

FIG. 5 is a flowchart showing an example of the flow of processes in an image display program according to the first embodiment of the disclosure;

FIG. 12 is a flowchart showing an example of the flow of the wide range image display process;

FIG. 13A is a schematic diagram showing the standard image and the wide range image when making a right turn;

DETAILED DESCRIPTION

Exemplary embodiments of the present disclosure will now be described in detail below with reference to the drawings.

First Embodiment

The image display system of the disclosure is a image display system for a motorcycle, and displays rear view image of the area behind the host vehicle to the rider. Here, "motorcycle" means two-wheeled motorcycles, three-wheeled motorcycles, or four-wheeled motorcycles among saddle-style vehicles that a rider rides by straddling the vehicle. This includes motorcycles that use an engine as a drive source and motorcycles that use a motor as a drive source. Examples of motorcycles include motorbikes, scooters, and electrically powered scooters. Below, a case where the motorcycle is a two-wheeled motorcycle will be described.

Configuration of Image Display System

First, the configuration of the image display system will be described.

Figure 1:
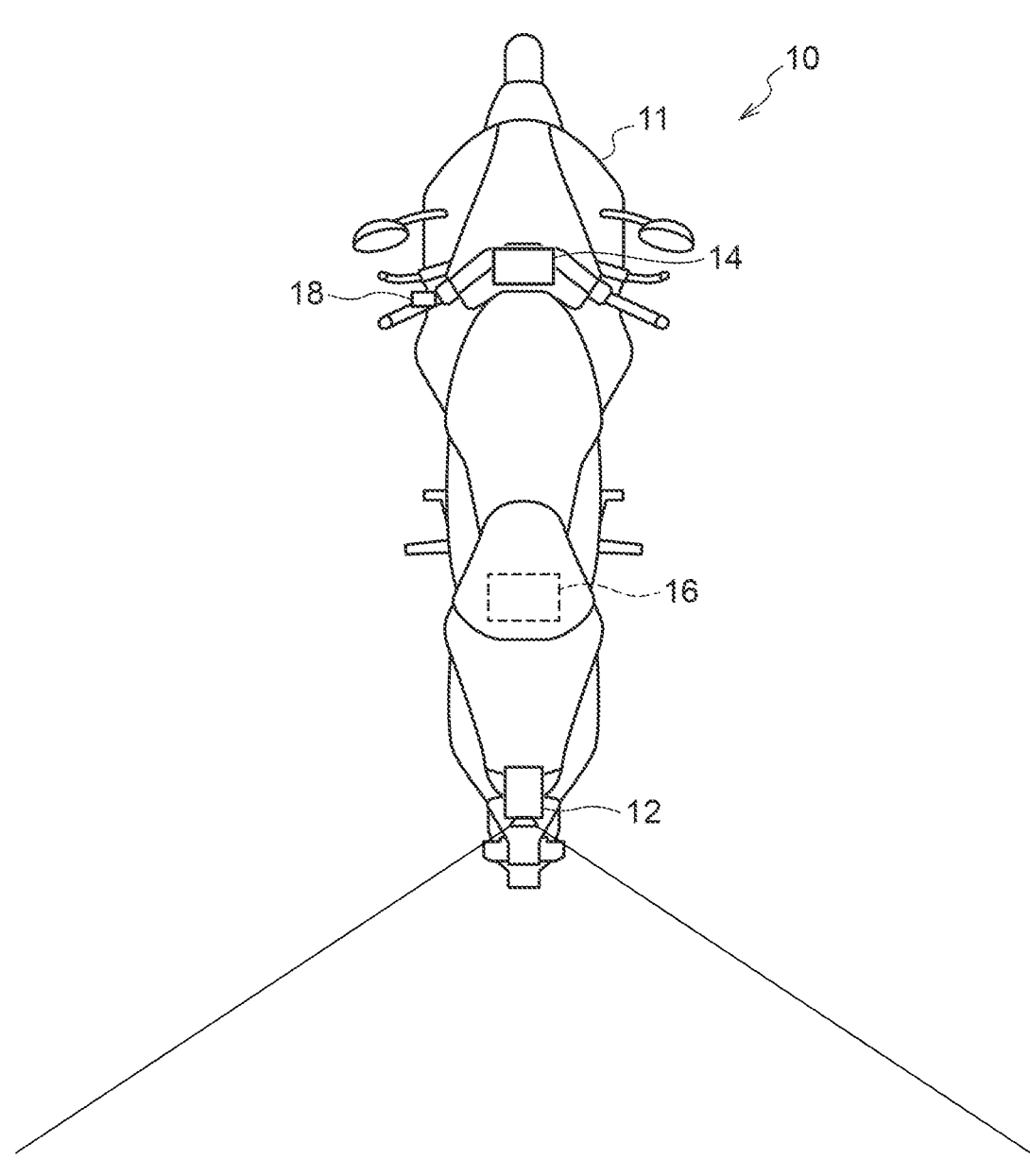
FIG. 1 is a schematic view showing an example of the configuration of an image display system according to a first embodiment of the disclosure.

FIG. 1 is a schematic view showing an example of the configuration of an image display system 10. As shown in FIG. 1, the image display system 10 includes an image capture device 12, a display device 14, a control device 16, and an operation device 18. Although FIG. 1 shows one each of each device, the image display system 10 may be provided with more than one each of the image capture device 12, the display device 14, and the operation device 18.

The image capture device 12 is a device that captures rear view image of the area behind a vehicle body 11 of the motorcycle. The image capture device 12 may be a camera with an angle of view less than 60 degrees or a camera including a wide-angle lens with an angle of view equal to or greater than 60 degrees. As the image capture device 12, for example, a digital video camera including an image sensor such as a CCD image sensor or a CMOS image sensor can be used.

The display device 14 is a device that displays rear view image of the area behind the vehicle to the rider. As a display unit 40 of the display device 14 (see FIG. 3), for example, a display such as a liquid crystal display, an organic EL display, or a touch panel display having a configuration where a touch panel is overlaid on these displays can be used. The display device 14 is installed in a position in front of a rider in which it is easy for the rider to see it.

Figure 2:
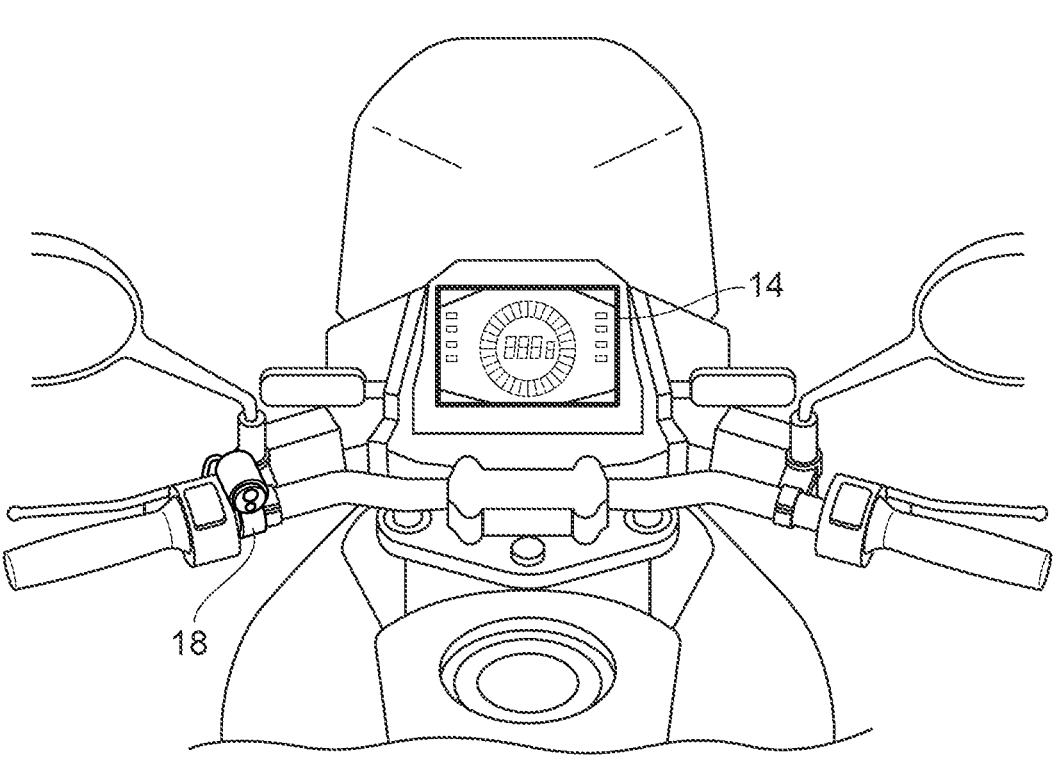
FIG. 2 is a schematic view showing an example of the arrangement of a display device and an example of an operation device.

As the display device 14, a display built in the instrument panel of the vehicle body 11 may be used or an add-on display may be used. For example, as shown in FIG. 2, when a built-in display is used, the display device 14 can be disposed in the center of the instrument panel. Furthermore, when an add-on display is used, the display device 14 can be disposed near the meter display. In this case, the distance from the rider to the meters (e.g., the meter display) and the distance from the rider to the display device 14 can be made substantially the same, whereby it becomes easy for the rider to focus on the display device 14.

The control device 16 is a control function unit of an electronic control unit (ECU) provided for controlling the display device 14. The control device 16 is installed inside the vehicle body 11 by, for example, embedding it inside the seat.

The operation device 18 is a device for the rider to input operations. As the operation device 18, for example, a handle switch attached near a handle can be used. According to the handle switch, the rider can input operations even while driving. The operation device 18 may, for example, be a push button switch as shown in FIG. 2, and the push button switch can be attached to the left grip. Furthermore, as described later, a turn switch can also be used as the operation device 18.

Electrical Configurations of Image Display System

Next, electrical configurations of the image display system 10 will be described.

Figure 3:
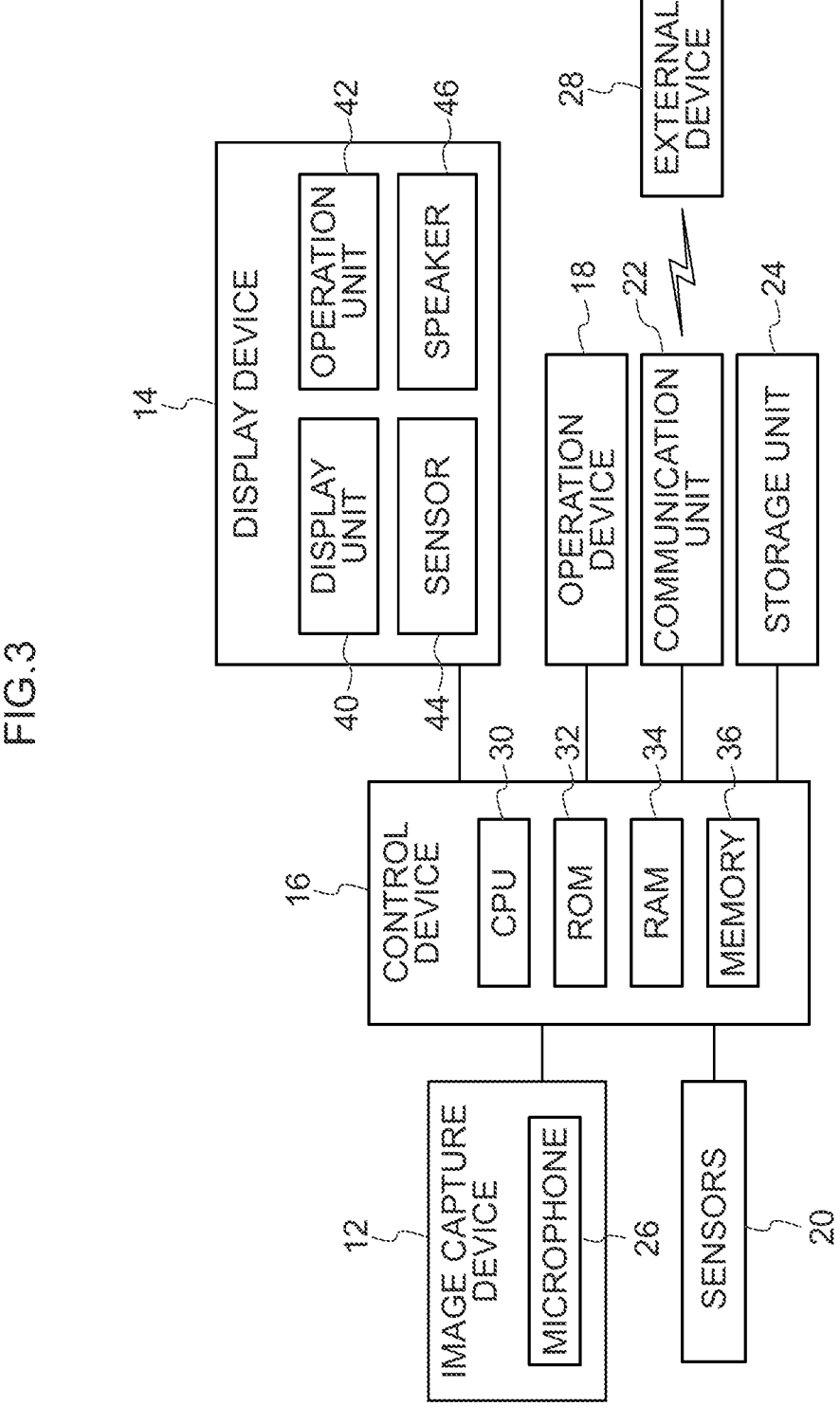
FIG. 3 is a block diagram showing an example of electrical configurations of the image display system according to the first embodiment of the disclosure.

FIG. 3 is a block diagram showing an example of the electrical configurations of the image display system 10. The control device 16 includes a central processing unit (CPU) 30, a read-only memory (ROM) 32, a random-access memory (RAM) 34, and a nonvolatile memory 36. Prestored in the ROM 32 or the nonvolatile memory 36 is a image display program described later. The CPU 30 reads the prestored program and executes the program using the RAM 34 as a work area.

The image capture device 12, the display device 14, and the operation device 18 are connected by wires or wirelessly to, so as to be capable of exchanging data with, the control device 16. Furthermore, various sensors 20, a communication unit 22, and a storage unit 24 are also connected by wires or wirelessly to, so as to be capable of exchanging data with, the control device 16. The control device 16 exchanges information with and controls each unit.

The sensors 20 include, for example, an inclination sensor for detecting inclination of the vehicle body 11 and an acceleration sensor. The communication unit 22 is an interface for communicating with an external device 28. The storage unit 24 is an external storage device such as a hard disk drive (HDD) or a memory card (e.g., an SD card). In the storage unit 24 are stored image data of various screens described later. The control device 16 is housed in a case together with the communication unit 22 and the storage unit 24 and is installed inside the vehicle body 11 as an ECU.

The display device 14 includes a display unit 40, an operation unit 42, a sensor 44, and a speaker 46. The display unit 40 is a display for displaying image based on image data. The operation unit 42 is a switch or a button for inputting operations. The sensor 44 is an acceleration sensor for detecting the orientation of the display device 14. The speaker 46 is a device that outputs audio based on audio data.

The configurations described above are examples, and new members can also be added thereto and some members can also be omitted therefrom. For example, the image display system 10 may include a microphone 26 for picking up audio around the vehicle. The microphone 26 may, for example, be a microphone built into the image capture device 12 as shown in FIG. 3.

Here, the operation of the image display system 10 will be briefly described.

Rear view image of the area behind the vehicle is captured by the image capture device 12, and the obtained image data are output to the control device 16. The control device 16 processes the obtained image data and outputs the image data to the display device 14. The display device 14 displays image based on the obtained image data.

Furthermore, the rider can give various instructions via the operation device 18, such as, for example, an instruction to switch the screen displayed on the display device 14. The control device 16 switches, for example, a screen that displays a standard image to a screen that displays a wide range image in response to an instruction from the rider. It will be noted that the input of operations by the rider can also be performed via the operation unit 42 of the display device 14 and can also be performed via an operation screen displayed on the display unit 40 of the display device 14.

It will be noted that the screen that displays the standard image corresponds to a first screen that displays a first image corresponding to a first area of the disclosure, and the screen that displays the wide range image corresponds to a second screen that displays a second image corresponding to a second area of the disclosure.

Functional Configurations of Control Device

Next, functional configurations of the control device 16 will be described.

Figure 4:
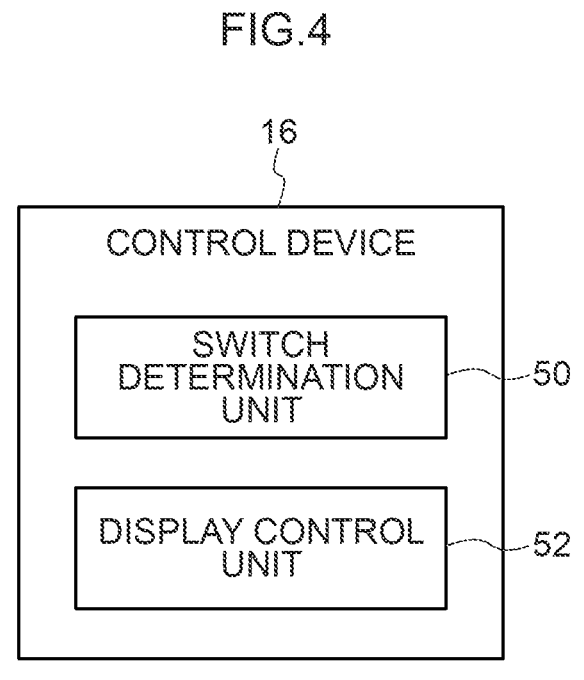

FIG. 4 is a functional block diagram showing an example of the functional configurations of the control device 16. The control device 16 includes a switch determination unit 50 and a display control unit 52. These functional units are realized as a result of the image display program described later being executed by the CPU 30 of the control device 16.

Image Display Program

Next, the image display program will be described.

FIG. 5 is a flowchart showing an example of the flow of processes in the image display program. The image display program is executed by the CPU 30 of the control device 16 and is started when the display device 14 is turned on. Here, excluding step S112, the operations of the CPU 30 will be described as operations of the functional units shown in FIG. 4.

In the first embodiment, the operation device 18 is a dedicated switch for giving an instruction to switch screens. The operation device 18 can, for example, be the push button switch shown in FIG. 2. When the rider pushes the button, the screen displayed on the display device 14 is sequentially switched.

It will be noted that instructions to turn the display device 14 on and off may be given by operating a switch such as an engine starter switch. Alternatively, instructions to turn the display device 14 on and off may be given by operating other switch included the operation device 18, such as, for example, pushing a different button or changing the way in which the button is pushed.

First, in step S100 the display control unit 52 causes the display device 14 to display an initial screen. When the display device 14 is turned on, first, the initial screen is displayed. The initial screen is a screen on which image is not displayed; for example, it can be a vehicle information screen on which vehicle information, such as vehicle speed, mileage, engine speed, water temperature, and remaining fuel amount, for example, is displayed. Furthermore, the initial screen may be a screen on which nothing is displayed.

Next, in step S102 the switch determination unit 50 determines whether or not an instruction to switch screens has been given during display of the initial screen. When an instruction to switch screens has been given, the process proceeds to step S104. When an instruction to switch screens has not been given, the process returns to step S102 and the switch determination unit 50 repeatedly determines whether or not an instruction to switch screens has been given until an instruction is given.

Figure 6A:
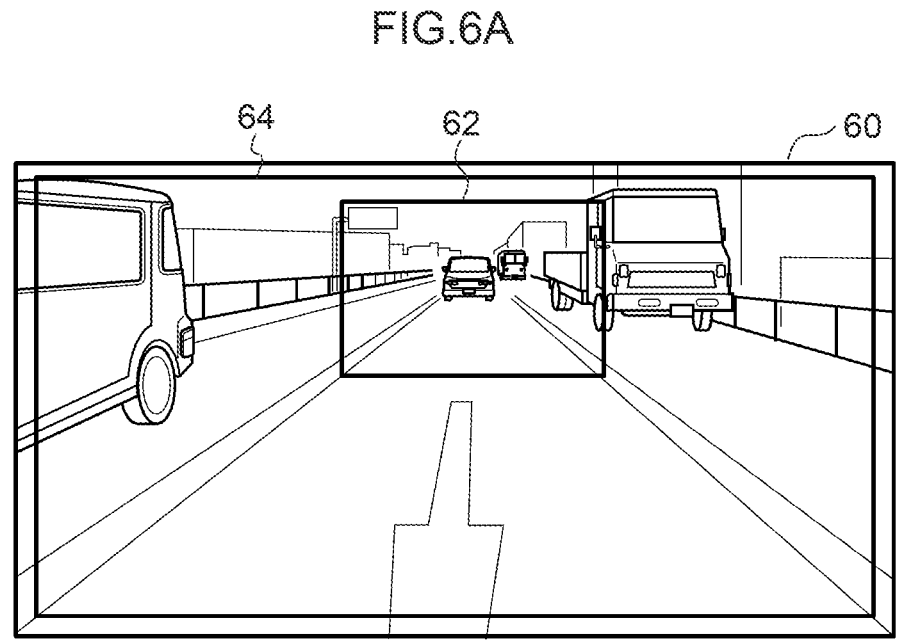
FIG. 6A is a schematic diagram showing a standard image and a wide range image.

Next, in step S104 the display control unit 52 executes a standard image display process that switches the display screen to a screen that displays a standard image. A standard image 71 shown in FIG. 6C is a image obtained by cutting out a partial area 62 from an imaging range of a captured image 60 as shown in FIG. 6A and inverting it. The standard image 71 is displayed at a magnification whereby the displayed image has the same size as that of a mirror image in an optical mirror so that the rider may easily grasp a sense of the distance to a following vehicle and a sense of the size of the following vehicle. Furthermore, the reason the display device 14 displays an inverted image is that displaying image with the same orientation as that of a mirror image appearing in a rearview optical mirror allows the rider to easily grasp the situation behind the vehicle.

Figure 6B:
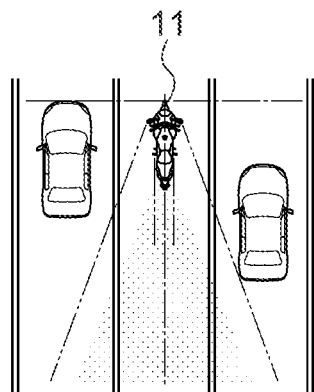
FIG. 6B is a view of a vehicle seen from above.
Figure 6C:
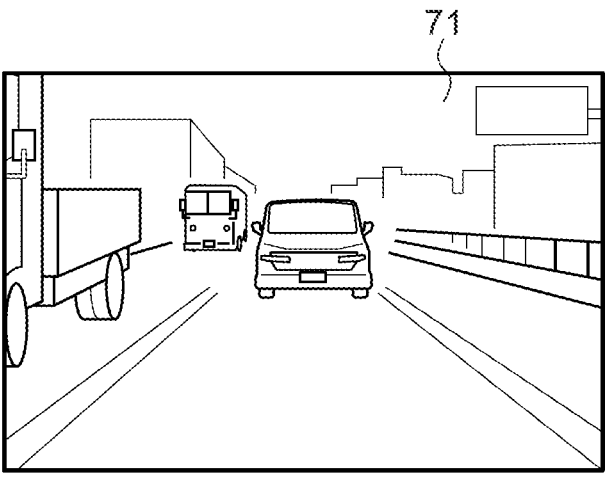
FIG. 6C is a schematic diagram showing the standard image.

FIG. 6B is a view of the vehicle seen from above. The dash-double-dot lines extending from the rearview optical mirrors represent the field of view of the optical mirrors, and the dash-double-dot lines extending directly behind the vehicle represent the blind spot area directly behind the vehicle. Furthermore, the shaded area represents the cut out range of the standard image 71.

The image capture device 12 captures a wide range of the area behind the vehicle, but what the rider wants to see is the area that is the blind spot directly behind the rider. At the same time, the rear view image is captured so that this blind spot area directly behind the rider appears in the center of the imaging range. Consequently, the area 62 including the central portion of the imaging range is cut out as the display range. By cutting out and displaying the partial area 62, the range that the rider wants to see can be displayed large in the standard image 71 as shown in FIG. 6C.

It will be noted that the vehicle width direction in real space corresponds to the left and right direction on the display image. For this reason, in the description of the image, sometimes the vehicle width direction will be called "the left and right direction."

Figure 7A:
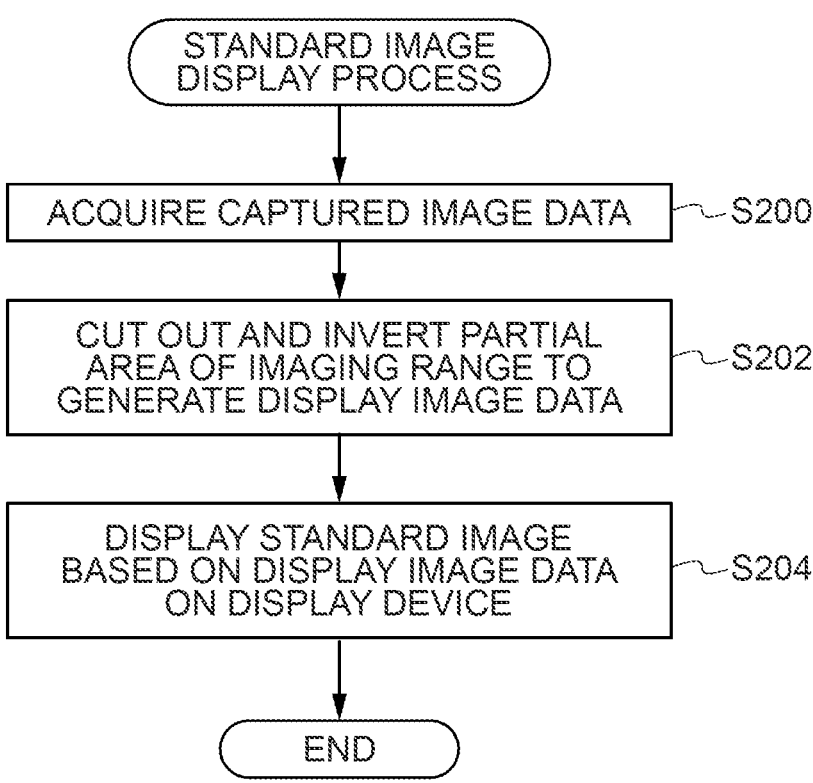
FIG. 7A is a flowchart showing an example of the flow of a standard image display process.

Here, the flow of the standard image display process will be described. As shown in FIG. 7A, the display control unit 52 acquires the image data from the image capture device 12 (step S200). Here, the unprocessed image data obtained from the image capture device 12 will be called captured image data. Next, the display control unit 52 performs image processing on the captured image data so as to cut out a partial area of the imaging range as the display range and horizontally invert the image in the display range to thereby generate image data for display to be displayed on the display device 14 (step S202). Here, the image data for display will be called display image data. Next, the display control unit 52 outputs the display image data to the display device 14 and causes the display device 14 to display image based on the display image data (step S204).

It will be noted that when generating the display image data, the display control unit 52 may perform image processing such as rotation correction, distortion correction, color correction, and denoising.

Returning to FIG. 5, next, in step S106 the switch determination unit 50 determines whether or not an instruction to switch screens has been given during display of the standard image. When an instruction to switch screens has been given, the process proceeds to step S108. When an instruction to switch screens has not been given, the process returns to step S106 and the switch determination unit 50 repeatedly determines whether or not an instruction to switch screens has been given until an instruction is given.

Figure 6D:
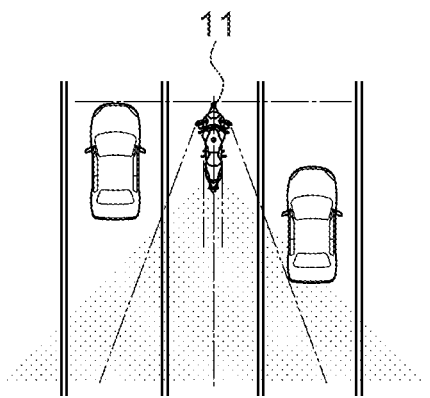
FIG. 6D is a view of the vehicle seen from above.
Figure 6E:
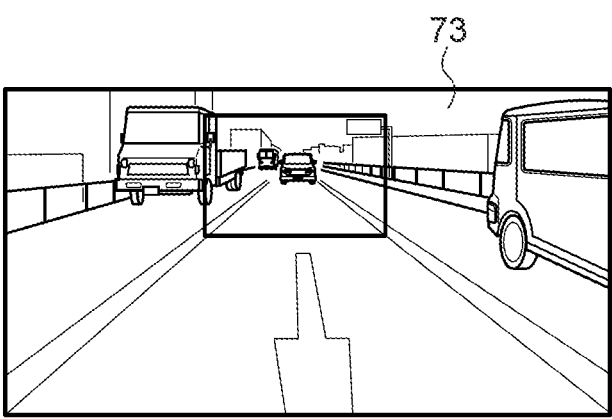
FIG. 6E is a schematic diagram showing the wide range image.

Next, in step S108 the display control unit 52 executes a wide range image display process that switches the display screen to a screen that displays a wide range image. A wide range image 73 shown in FIG. 6E is a image obtained by cutting out a wider area 64 than the area 62 from the imaging range of the captured image 60 as shown in FIG. 6A and inverting it. FIG. 6D is a view of the vehicle seen from above. The shaded area represents the cut out range of the wide range image 73. There are cases where the rider wants to check a wide range area when changing lanes or making a right or left turn. For this reason, the display control unit 52 causes the display device 14 to display the wide range image 73 in response to an instruction from the rider.

It will be noted that the area 64 may include all areas of the imaging range of the captured image 60. In this case, the cutting-out can be omitted.

Figure 7B:
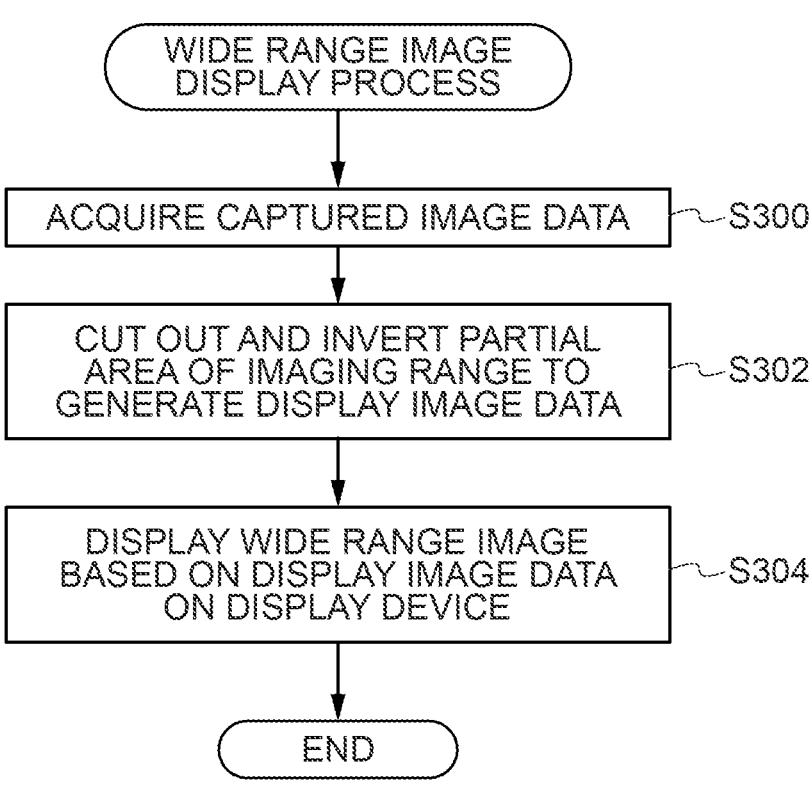
FIG. 7B is a flowchart showing an example of the flow of a wide range image display process.

Here, the flow of the wide range image display process will be described. As shown in FIG. 7B, the display control unit 52 acquires the captured image data from the image capture device 12 (step S300). Next, the display control unit 52 performs image processing on the captured image data so as to cut out a partial area of the imaging range as the display range and horizontally invert the image in the display range to thereby generate display image data to be displayed on the display device 14 (step S302). Next, the display control unit 52 outputs the display image data to the display device 14 and causes the display device 14 to display image based on the display image data (step S304).

Returning to FIG. 5, next, in step S110 the switch determination unit 50 determines whether or not an instruction to switch screens has been given during display of the wide range image. When an instruction to switch screens has been given, the process returns to step S100, where the display control unit 52 causes the display device 14 to display the initial screen. When an instruction to switch screens has not been given, the process proceeds to step S112.

Next, in step S112 the CPU 30 determines whether or not to end the display. For example, when an instruction to turn off the display device 14 is given, the CPU 30 makes a YES determination in step S112 and ends the routine. When the display is not to be ended, the CPU 30 makes a NO determination in step S112 and the process returns to step S110, where the switch determination unit 50 repeatedly determines whether or not an instruction to switch screens has been given. Consequently, the processes of step S100 to step S112 are repeatedly executed until the display device 14 is turned off.

Figure 8:
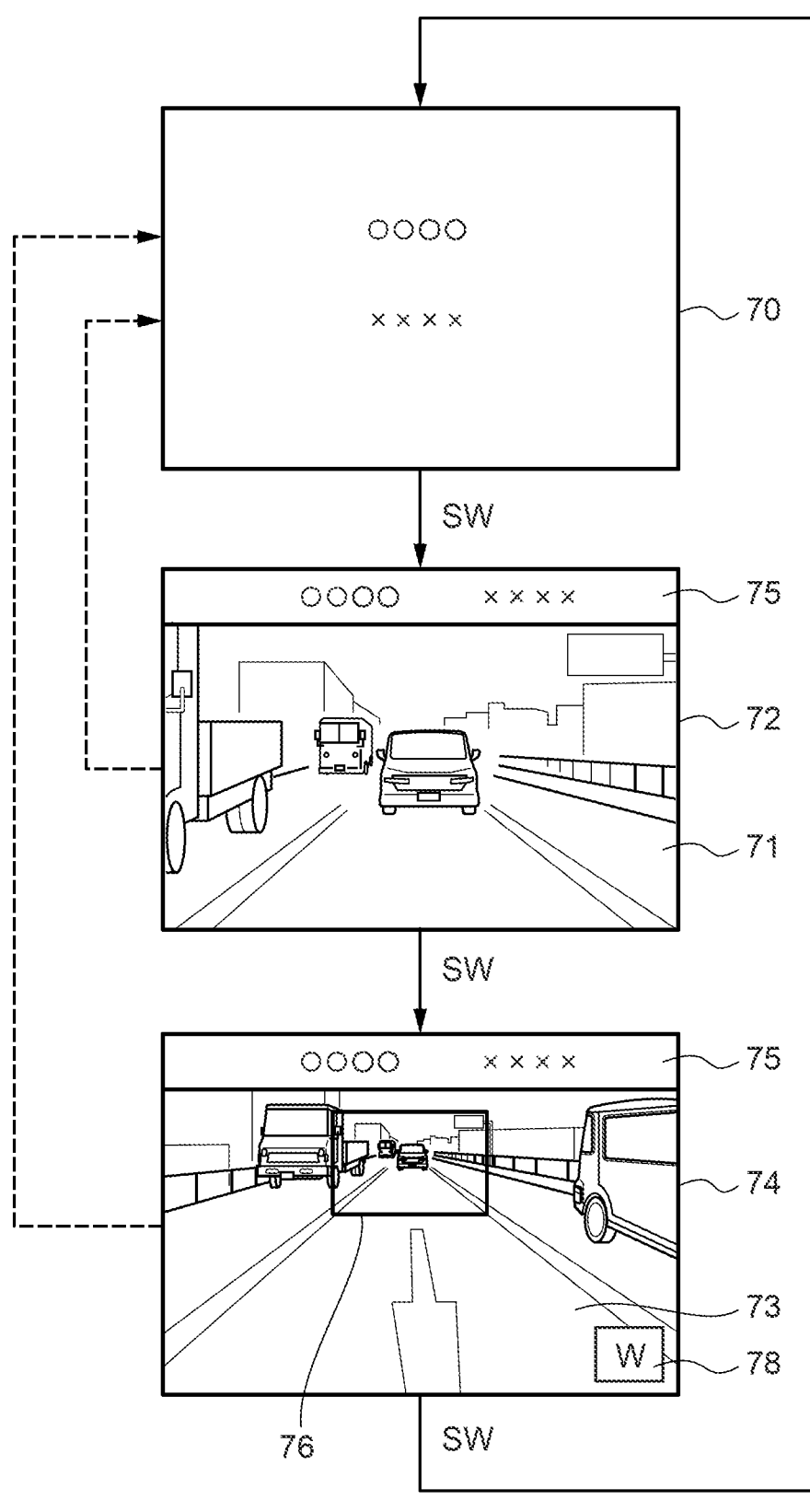
FIG. 8 is a schematic diagram showing screen transitions in response to switch operations.

FIG. 8 is a schematic diagram showing screen transitions in response to switch operations. As indicated by the solid line in FIG. 8, when the display device 14 is turned on, first, an initial screen (i.e., a vehicle information screen) 70 is displayed on the display device 14. When the switch is pushed so that an instruction to switch screens is given during display of the initial screen 70, the display screen transitions from the initial screen 70 to a screen 72 that displays the standard image 71.

When the switch is pushed so that an instruction to switch screens is given during display of the screen 72, the display screen transitions from the screen 72 that displays the standard image 71 to a screen 74 that displays the wide range image 73. When the switch is pushed so that an instruction to switch screens is given during display of the screen 74, the display screen transitions from the screen 74 that displays the wide range image 73 to the initial screen 70.

An image 75 that displays the vehicle information included in the initial screen 70 may be superimposed and displayed on the screen 72 that displays the standard image 71 and the screen 74 that displays the wide range image 73. The image 75 that displays the vehicle information can, for example, be displayed in end portions (e.g., upper end portions or lower end portions) of the screen 72 and the screen 74. Furthermore, a frame 76 indicating the area displayed in the standard image 71 and an icon 78 indicating that the wide range image is currently being displayed may be superimposed and displayed on the screen 74 that displays the wide range image 73.

Furthermore, the push button switch may be configured to be subjected to long pressing (i.e. holding down). In the example described above, the display screen is switched between three screens by operating the switch two times, so that when the switch is pushed during display of the initial screen 70, the display screen transitions to the screen 72 that displays the standard image 71, and when the switch is pushed during display of the screen 72, the display screen transitions to the screen 74 that displays the wide range image 73, but the display screen may be switched between three screens by operating the switch one time by holding down the switch. Continuous operation of the switch can be regarded as an instruction to switch screens.

Furthermore, the dedicated switch may be a switch for giving an instruction to display the wide range image 73. In this case also, when the switch is pushed during display of the initial screen 70, the display screen does not directly transition from the initial screen 70 to the screen 74 that displays the wide range image 73 but transitions to the screen 72 that displays the standard image 71 and, for example, after a predetermined amount of time elapses since transitioning to the screen 72, transitions from the screen 72 to the screen 74 that displays the wide range image 73.

As described above, according to the image display system according to the first embodiment, various advantageous effects such as described below can be obtained.

(1) The image capture device captures a wide range of the area behind the vehicle, but the standard image obtained by cutting out the area of the imaging range that the rider wants to see is displayed on the display device disposed in front of the rider while the rider is driving, so the range that the rider wants to see is displayed large, thus improving visibility. Furthermore, the rider becomes able to check the area that is a blind spot directly behind the vehicle, and it becomes easy for the rider to check the area behind the vehicle. Moreover, because it becomes easy for the rider to check the area behind the vehicle, rearward-glancing actions by the rider can be reduced, and an improvement in safety is expected.

(2) The wide range image is displayed in response to an instruction from the rider. This makes it easy for the rider to grasp the situation around the host vehicle. Furthermore, the wide range image is not suddenly displayed; rather, the standard image is displayed at the same magnification as that of the optical mirrors and then the wide range image is displayed after that, so the rider can look at the wide range image while maintaining a sense of the distance to the following vehicle and a sense of the size of the following vehicle.

Second Embodiment

In the first embodiment, the screen is sequentially switched by operating the switch, but in a second embodiment, a time limit is placed on the display of the rear view image, and when a subsequent operation of the switch is not performed within a predetermined amount of time, the display screen returns to the initial screen.

In the second embodiment, the flow of processes in the image display program is different from that of the first embodiment. For this reason, description of parts that are the same as those of the first embodiment will be omitted, and just differences will be described.

Image Display Program

Next, the image display program will be described.

Figure 9:
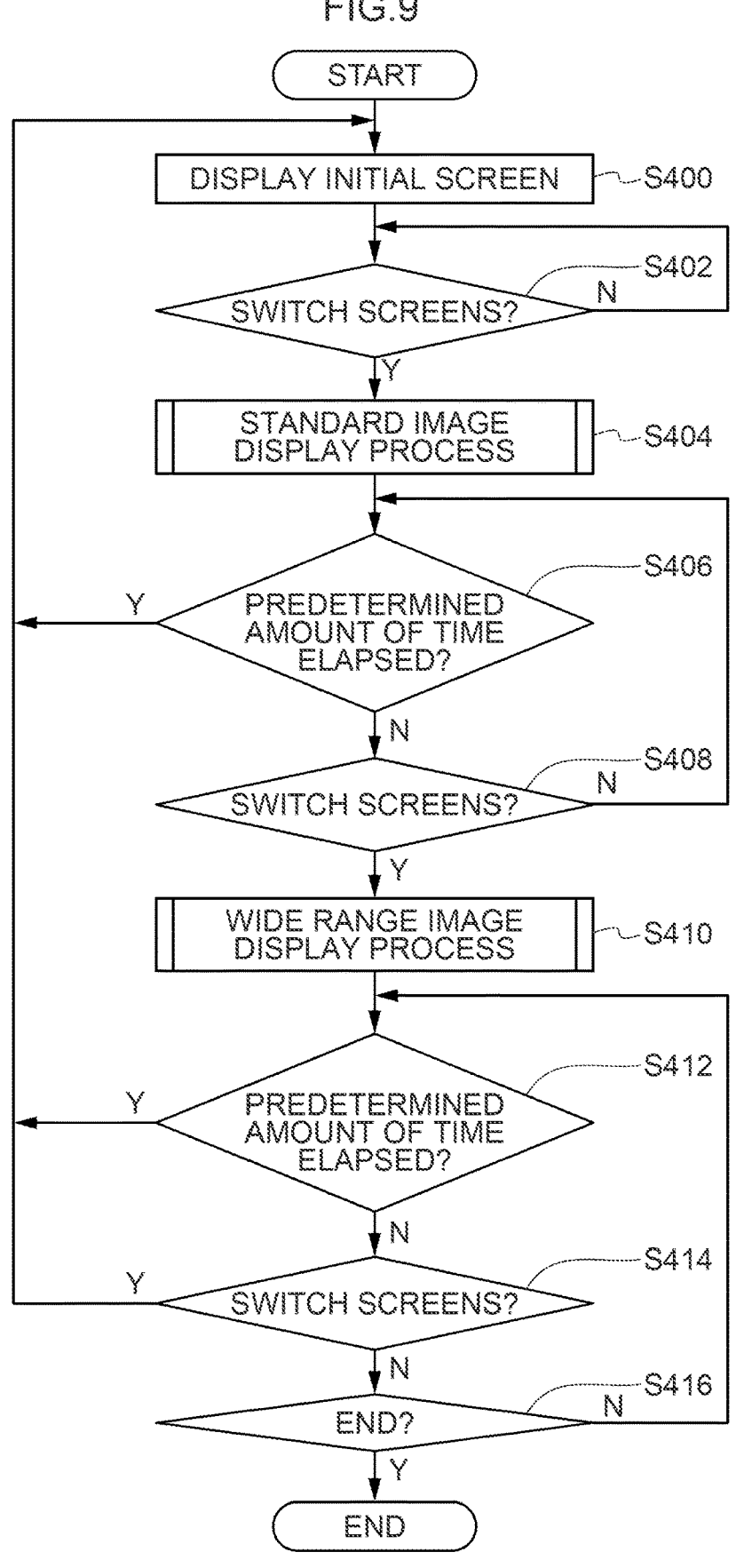
FIG. 9 is a flowchart showing an example of the flow of processes in an image display program according to a second embodiment of the disclosure.

FIG. 9 is a flowchart showing an example of the flow of processes in the image display program according to the second embodiment. The image display program is executed by the CPU 30 of the control device 16 and is started when the display device 14 is turned on. Here, excluding step S416, the operations of the CPU 30 will be described as operations of the functional units shown in FIG. 4.

First, in step S400 the display control unit 52 causes the display device 14 to display the initial screen. Next, in step S402 the switch determination unit 50 determines whether or not an instruction to switch screens has been given during display of the initial screen. When an instruction to switch screens has been given, the process proceeds to step S404. When an instruction to switch screens has not been given, the process returns to step S402 and the switch determination unit 50 repeatedly determines whether or not an instruction to switch screens has been given until an instruction is given.

Next, in step S404 the display control unit 52 executes the standard image display process that switches the display screen to a screen that displays the standard image. Next, in step S406 the switch determination unit 50 determines whether a predetermined amount of time has elapsed since switching to the screen that displays the standard image. When the predetermined amount of time has elapsed, the process returns to step S400, where the display control unit 52 causes the display device 14 to display the initial screen. When the predetermined amount of time has not elapsed, the process proceeds to step S408.

Next, in step S408 the switch determination unit 50 determines whether or not an instruction to switch screens has been given during display of the standard image. When an instruction to switch screens has been given, the process proceeds to step S410. When an instruction to switch screens has not been given, the process returns to step S406.

Next, in step S410 the display control unit 52 executes the wide range image display process that switches the display screen to a screen that displays the wide range image. Next, in step S412 the switch determination unit 50 determines whether a predetermined amount of time has elapsed since switching to the screen that displays the wide range image. When the predetermined amount of time has elapsed, the process returns to step S400, where the display control unit 52 causes the display device 14 to display the initial screen. When the predetermined amount of time has not elapsed, the process proceeds to step S414.

Next, in step S414 the switch determination unit 50 determines whether or not an instruction to switch screens has been given during display of the wide range image. When an instruction to switch screens has been given, the process returns to step S400, where the display control unit 52 causes the display device 14 to display the initial screen. When an instruction to switch screens has not been given, the process proceeds to step S416.

Next, in step S416 the CPU 30 determines whether or not to end the display. When the display is to be ended, the CPU 30 makes a YES determination in step S416 and ends the routine. When the display is not to be ended, the CPU 30 makes a NO determination in step S416 and the process returns to step S412. Consequently, the processes of step S400 to step S416 are repeatedly executed until the display device 14 is turned off.

As indicated by the solid line in FIG. 8, when the display device 14 is turned on, first, the initial screen 70 is displayed on the display device 14. When the switch is pushed so that an instruction to switch screens is given during display of the initial screen 70, the display screen transitions from the initial screen 70 to the screen 72 that displays the standard image 71.

When the switch is pushed so that an instruction to switch screens is given within the predetermined amount of time since display of the screen 72 was started, the display screen transitions from the screen 72 that displays the standard image 71 to the screen 74 that displays the wide range image 73 as indicated by the solid line in FIG. 8. When the predetermined amount of time elapses without the switch being pushed, the display screen transitions from the screen 72 that displays the standard image 71 to the initial screen 70 as indicated by the dashed line in FIG. 8.

Furthermore, when the switch is pushed so that an instruction to switch screens is given within the predetermined amount of time since display of the screen 74 was started, the display screen transitions from the screen 74 that displays the wide range image 73 to the initial screen 70 as indicated by the solid line in FIG. 8. Also when the predetermined amount of time elapses without the switch being pushed, the display screen transitions from the screen 74 that displays the wide range image 73 to the initial screen 70 as indicated by the dashed line in FIG. 8.

As described above, according to the image display system according to the second embodiment, in addition to the same advantageous effects as those of the first embodiment being obtained, annoyance when the rider is viewing forward can be reduced. That is, the rider may sometimes feel annoyance if the rear view image is always displayed on the display device disposed in front of the rider, but by placing a time limit on the display of the rear view image, such annoyance can be reduced.

Third Embodiment

In the first embodiment, the screen is sequentially switched by operating a dedicated switch, but in a third embodiment, the screen is switched in conjunction with the operation of a turn switch. Furthermore, in the first embodiment, the image display system is configured to simply display a wide range image, but in the third embodiment, the image display system is configured to be able to display a wide range image in the direction to which the rider wants to change course or the direction in which the vehicle makes a right or left turn (hereinafter called the "turn side").

In the third embodiment, the switch for switching screens, the display range of the wide range image, and the flow of processes (particularly the sub-routine of the wide range image display process) in the image display program are different from those of the first embodiment. For this reason, description of parts that are the same as those of the first embodiment will be omitted, and just differences will be described.

Figure 10:
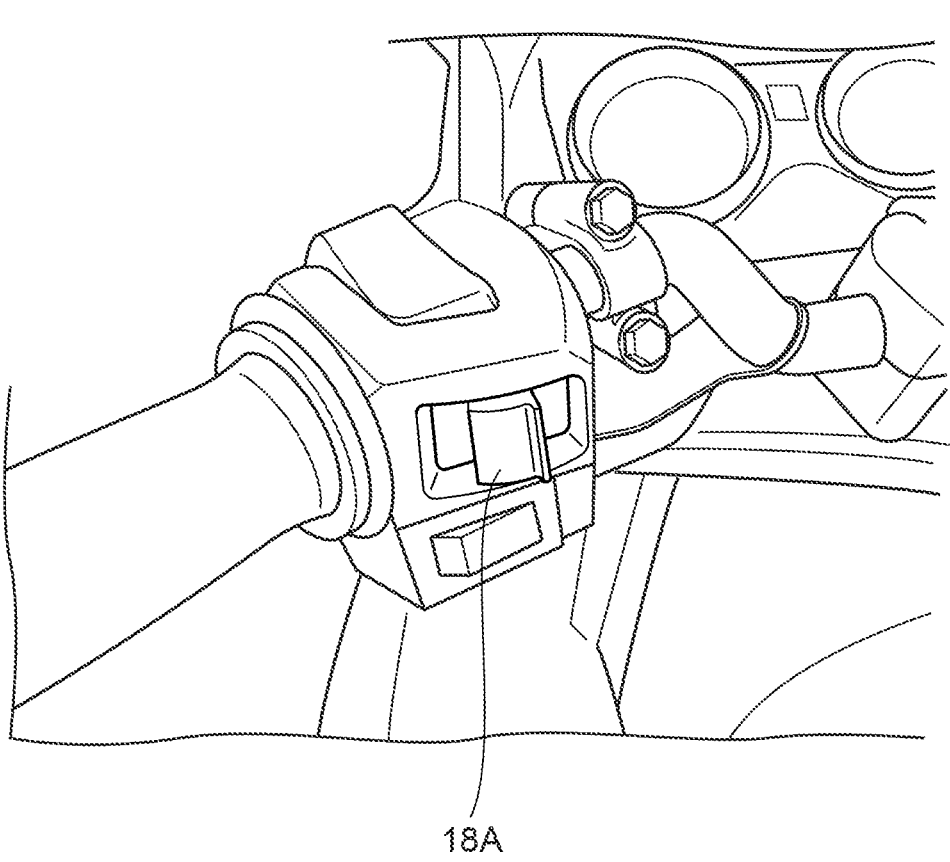
FIG. 10 is a schematic view showing another example of an operation device.

In the third embodiment, a turn switch 18A is an example of the operation device 18. The vehicle body 11 of the motorcycle is provided with the turn switch 18A as shown in FIG. 10. The turn switch may, for example, be a slide switch that moves left and right, with the switch being configured to return to a center position when the rider releases his/her finger from it. When changing course, the rider slides the slide switch left or right to activate the turn signal on the turn side. In the third embodiment, when the turn switch 18A is operated, the screen is switched in conjunction with that operation.

Image Display Program

Next, the image display program will be described.

Figure 11:
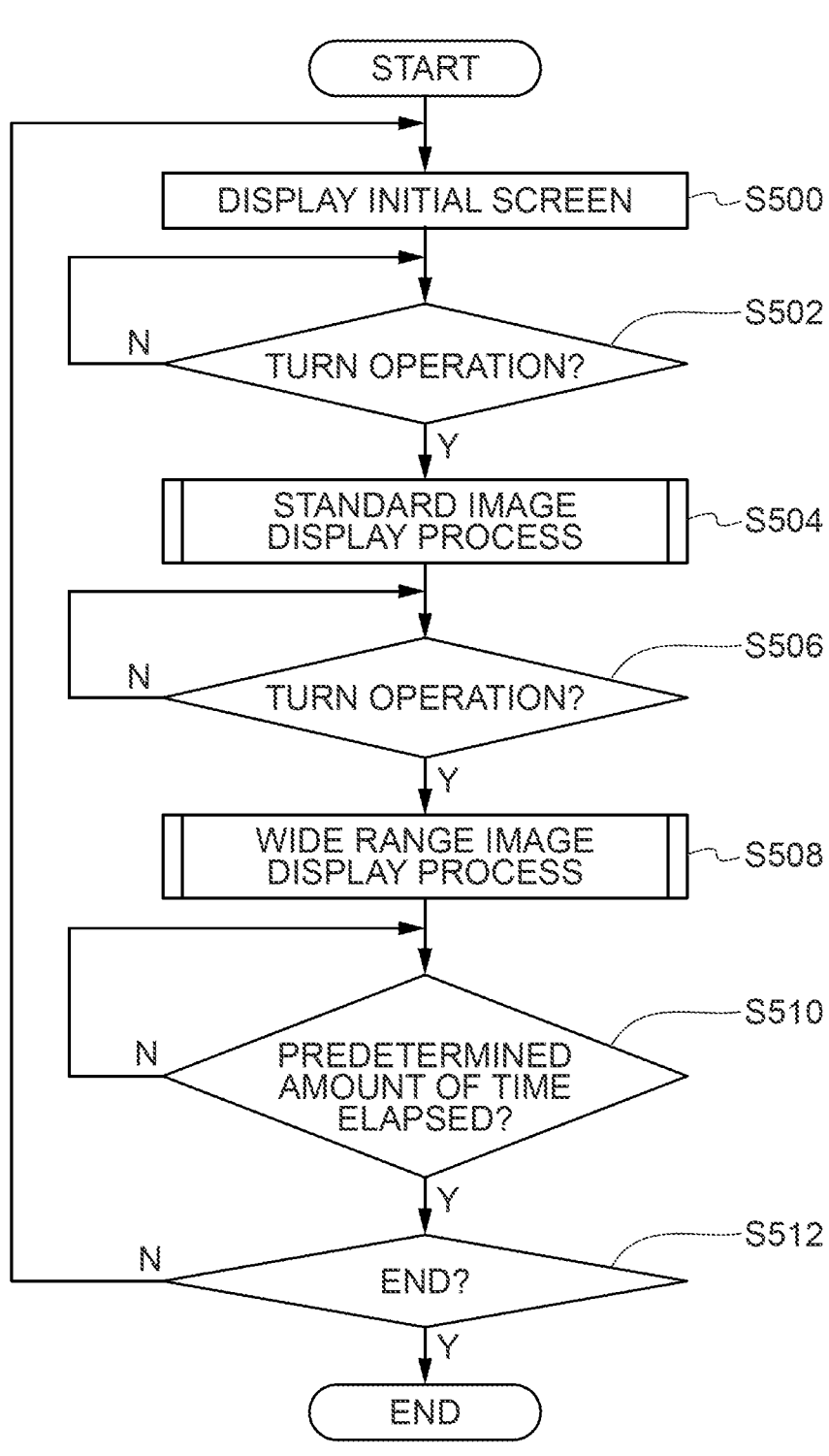
FIG. 11 is a flowchart showing an example of the flow of processes in an image display program according to a third embodiment of the disclosure.

FIG. 11 is a flowchart showing an example of the flow of processes in the image display program according to the third embodiment. The image display program is executed by the CPU 30 of the control device 16 and is started when the display device 14 is turned on.

The flow of processes is generally the same as that of the image display program shown in FIG. 5, and steps S500 to S512 of FIG. 11 correspond to steps S100 to S112 of FIG. 5. However, the content of the wide range image display process of step S508 is different from that of step S108 of FIG. 5, and the processes of step S510 and step S512 are also different from those of step S110 and step S112 of FIG. 5.

First, in step S500 the display control unit 52 causes the display device 14 to display the initial screen. Next, in step S502 the switch determination unit 50 determines whether or not the turn switch has been operated during display of the initial screen. When the turn switch has been operated, the process proceeds to step S504. When the turn switch has not been operated, the process returns to step S502 and the switch determination unit 50 repeatedly determines whether or not the turn switch has been operated.

Figure 13A:
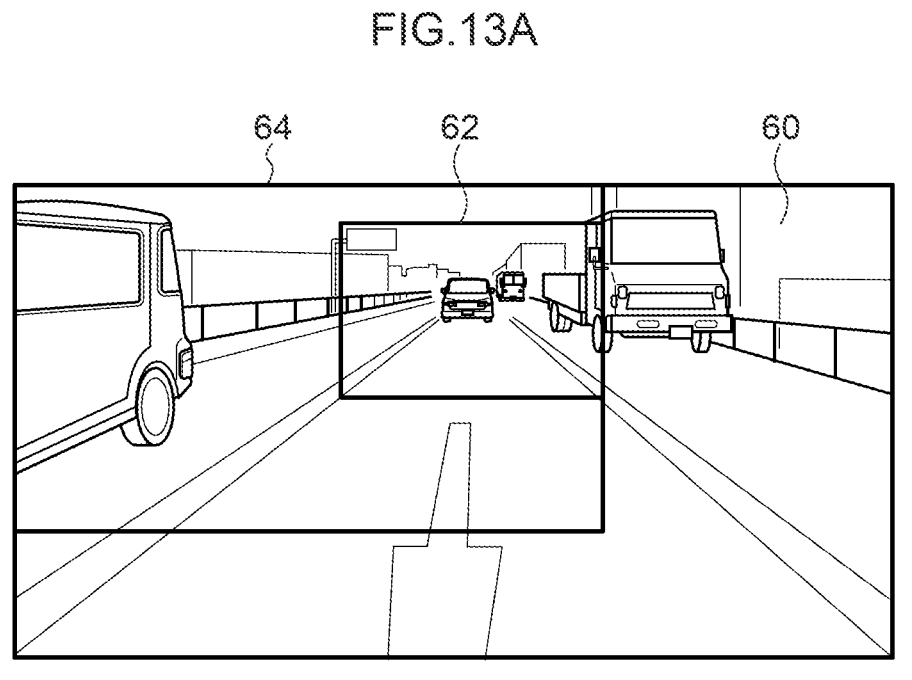
Figure 13B:
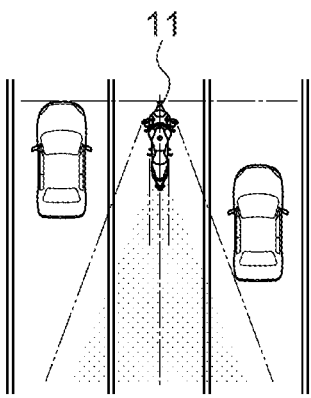
FIG. 13B is a view of the vehicle seen from above.
Figure 13C:
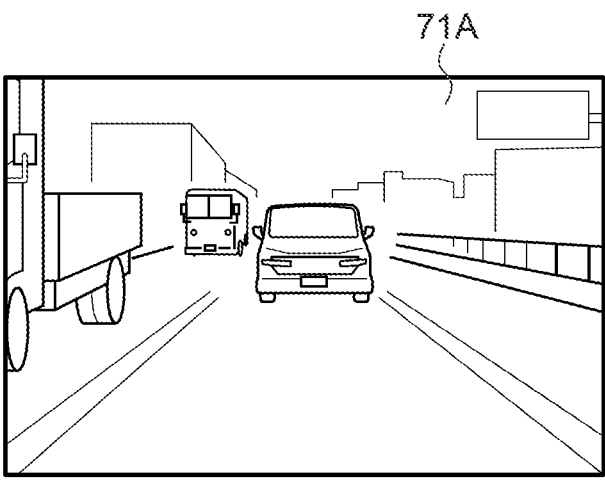
FIG. 13C is a schematic diagram showing the standard image.

Next, in step S504 the display control unit 52 executes the standard image display process that switches the display screen to a screen that displays the standard image. A standard image 71A shown in FIG. 13C is a image obtained by cutting out the partial area 62 from the imaging range of the captured image 60 as shown in FIG. 13A and inverting it. The shaded area in FIG. 13B represents the cut out range of the standard image 71A. Next, in step S506 the switch determination unit 50 determines whether or not the turn switch has been operated during display of the standard image. When the turn switch has been operated, the process proceeds to step S508. When the turn switch has not been operated, the process returns to step S506 and the switch determination unit 50 repeatedly determines whether or not the turn switch has been operated.

Figure 13D:
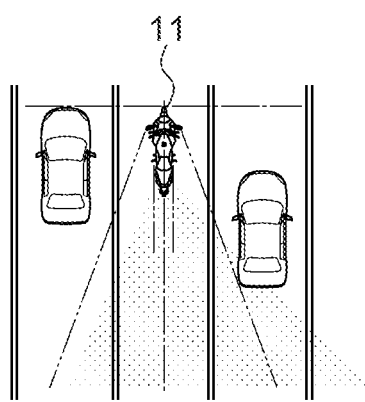
FIG. 13D is a view of the vehicle seen from above.
Figure 13E:
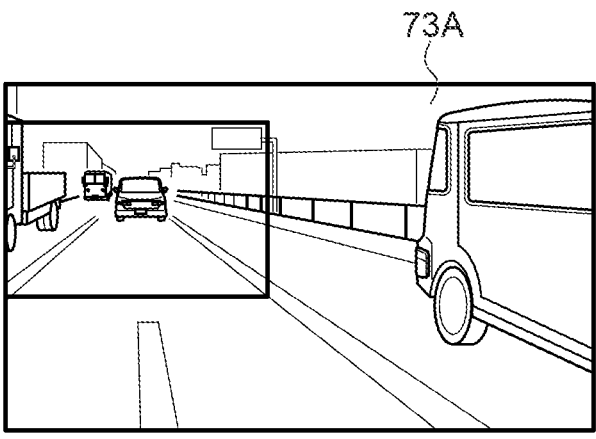
FIG. 13E is a schematic diagram showing the wide range image when making a right turn.

Next, in step S508 the display control unit 52 executes the wide range image display process that switches the display screen to a screen that displays a wide range image in which the turn side is wide. A wide range image 73A in which the turn side is wide shown in FIG. 13E is a image obtained by cutting out and inverting the area 64 so that the turn side of the imaging range of the captured image 60 is wide as shown in FIG. 13A. The shaded area in FIG. 13D represents the cut out range of the wide range image 73A. The wide range image 73A includes the blind spot area directly behind the vehicle and the blind spot area on the turn side. This example is a case where the vehicle makes a right turn, so the area 64 is an area where the right side is wide relative to the vehicle traveling direction and where the left side is wide in FIG. 13A which is an inverted image. In this example, the area 64 includes the area 62 that is cut out as the standard image, but the area 64 can also be cut out so as not to include the area

62. The rider can look at the rear view image on the turn side that the rider wants to check when making a right or left turn.

Furthermore, by cutting out and displaying the partial area 64 of the captured image 60 when displaying the wide range image in which the turn side is wide, magnification can be increased compared with a case where the entire imaging range is displayed. For example, compared with the wide range image 73 shown in FIG. 6E, in the wide range image 73A in which the turn side is wide shown in FIG. 13E, the following vehicle and the like are displayed in a larger size, so the visibility of the image is improved. Furthermore, there is less of a change in magnification from the standard image 71A than there is in a case where the entire imaging range is displayed, so it becomes easy for the rider to maintain a sense of the distance to the following vehicle and a sense of the size of the following vehicle.

Here, the flow of the wide range image display process will be described. As shown in FIG. 12, the display control unit 52 acquires the captured image data from the image capture device 12 (step S600). The display control unit 52 performs image processing on the captured image data so as to cut out a partial area on the turn side of the imaging range as the display range (step S602). Next, the display control unit 52 performs image processing on the captured image data so as to horizontally invert the image in the display range and thereby generate image data for display to be displayed on the display device 14 (step S604). Next, the display control unit 52 outputs the display image data to the display device 14 and causes the display device 14 to display image based on the display image data (step S606).

Returning to the description of FIG. 11, next, in step S510 the switch determination unit 50 determines whether a predetermined amount of time has elapsed since switching to the screen that displays the wide range image. When the predetermined amount of time has elapsed, the process proceeds to step S512. When the predetermined amount of time has not elapsed, the process returns to step S510 and the switch determination unit 50 repeatedly makes the determination until the predetermined amount of time elapses. Next, in step S512, the CPU 30 determines whether or not to end the display. When the display is to be ended, the CPU 30 makes a YES determination in step S512 and ends the routine. When the display is not to be ended, the CPU 30 makes a NO determination in step S512 and the process returns to step S500, where the display control unit 52 causes the display device 14 to display the initial screen.

The screen transitions will now be described with reference to the screen transition diagram of FIG. 8, but with the standard image 71 replaced with the standard image 71A (see FIG. 13C) and the wide range image 73 replaced with the wide range image 73A (see FIG. 13E). As indicated by the solid line in FIG. 8, when the display device 14 is turned on, first, the initial screen 70 is displayed on the display device 14. When the turn switch is operated during display of the initial screen 70, the display screen transitions from the initial screen 70 to the screen 72 that displays the standard image 71A. Next, when the turn switch is operated during display of the screen 72, the display screen transitions from the screen 72 that displays the standard image 71A to the screen 74 that displays the wide range image 73A.

In the third embodiment, the screen is switched in conjunction with the operation of the turn switch, but because the turn switch is a switch for activating the turn signals, the display screen is switched to the screen 74 that displays the wide range image 73A in which the turn side is wide and thereafter the display screen returns to the initial screen 70 when a predetermined amount of time elapses as indicated by the dashed line in FIG. 8 without requiring an operation of the switch.

As described above, according to the image display system according to the third embodiment, the following advantageous effects can be obtained in addition to the same advantageous effects as those of the first embodiment being obtained.

(1) The rider can look at a rear view image of the area behind the vehicle on the turn side that the rider wants to check, such as a rear view image of the adjacent lane, when changing course or making a right or left turn.

(2) The screen is automatically switched in response to situations such as changing course and making a right or left turn, so the number of times that the rider performs switch operations can be reduced.

(3) Compared with a case where the entire imaging range is displayed, the rear view image on the turn side is displayed in a large size, so the visibility of the image is improved.

(4) There is less of a change in magnification from the standard image to the wide range image than there is in a case where the entire imaging range is displayed, so it becomes easy for the rider to maintain a sense of the distance to the following vehicle and a sense of the size of the following vehicle.

Furthermore, the turn switch may also be configured to be subjected to long pressing (i.e. holding down) by, for example, holding it down with one's finger so that the switch does not return to the center position. Consequently, the display screen may be configured to transition from the initial screen 70 to the screen 72 that displays the standard image 71A and transition from the screen 72 to the screen 74 that displays the wide range image 73A by operating the switch one time by holding down the switch. Continuous operation of the switch can be regarded as an instruction to switch screens.

Furthermore, when the turn switch is operated, the rider presumably wants to see the wide range image in which the turn side is wide, so the display screen may be configured to transition from the initial screen 70 to the screen 72 that displays the standard image 71A and automatically transition from the screen 72 to the screen 74 that displays the wide range image 73A even without the rider holding down the switch.

Furthermore, in the third embodiment, the image display system causes the display device 14 to display the screen 74 that displays the wide range image 73A in which the turn side is wide, but the image display system may, in conjunction with an operation of the turn switch, cause the display device 14 to display the screen that simply displays the wide range image as in the first embodiment.

Furthermore, the turn switch 18A may be used in combination with the operation device 18 (i.e., the dedicated switch). For example, the switch from the initial screen 70 to the screen 72 that displays the standard image 71A may be performed by the dedicated switch, and the switch from the screen 72 that displays the standard image 71A to the screen 74 that displays the wide range image 73A may be performed by the turn switch 18A.

Fourth Embodiment

In the first embodiment, an example was described where the image display system displays two types of image, the standard image and the wide range image (including the wide range image in which the turn side is wide), but in a fourth embodiment, the image display system is configured to gradually (i.e., in stages or continuously) expand the area cut out from the imaging range.

Figure 14A:
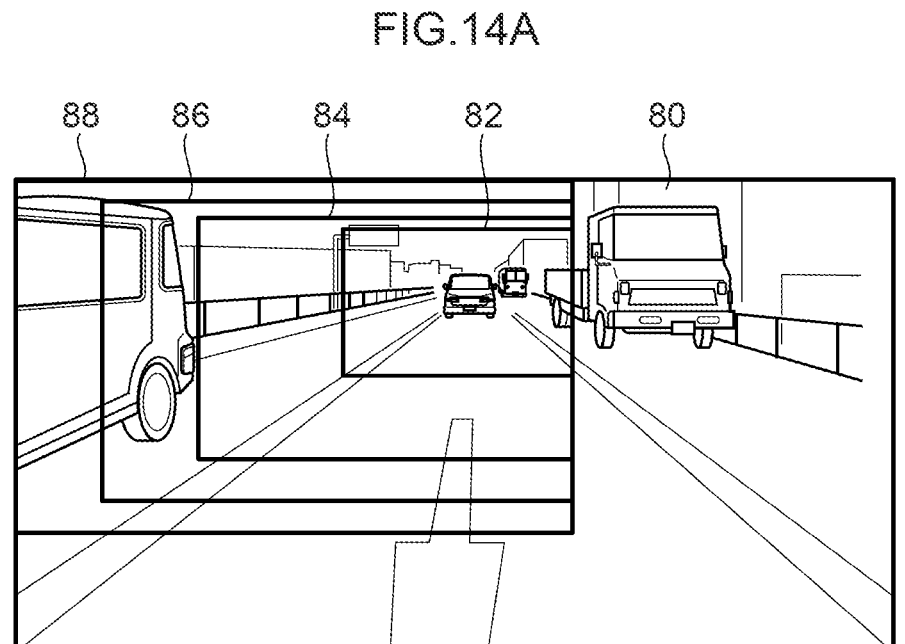
FIG. 14A is a schematic diagram showing image being switched in stages.
Figure 14B:
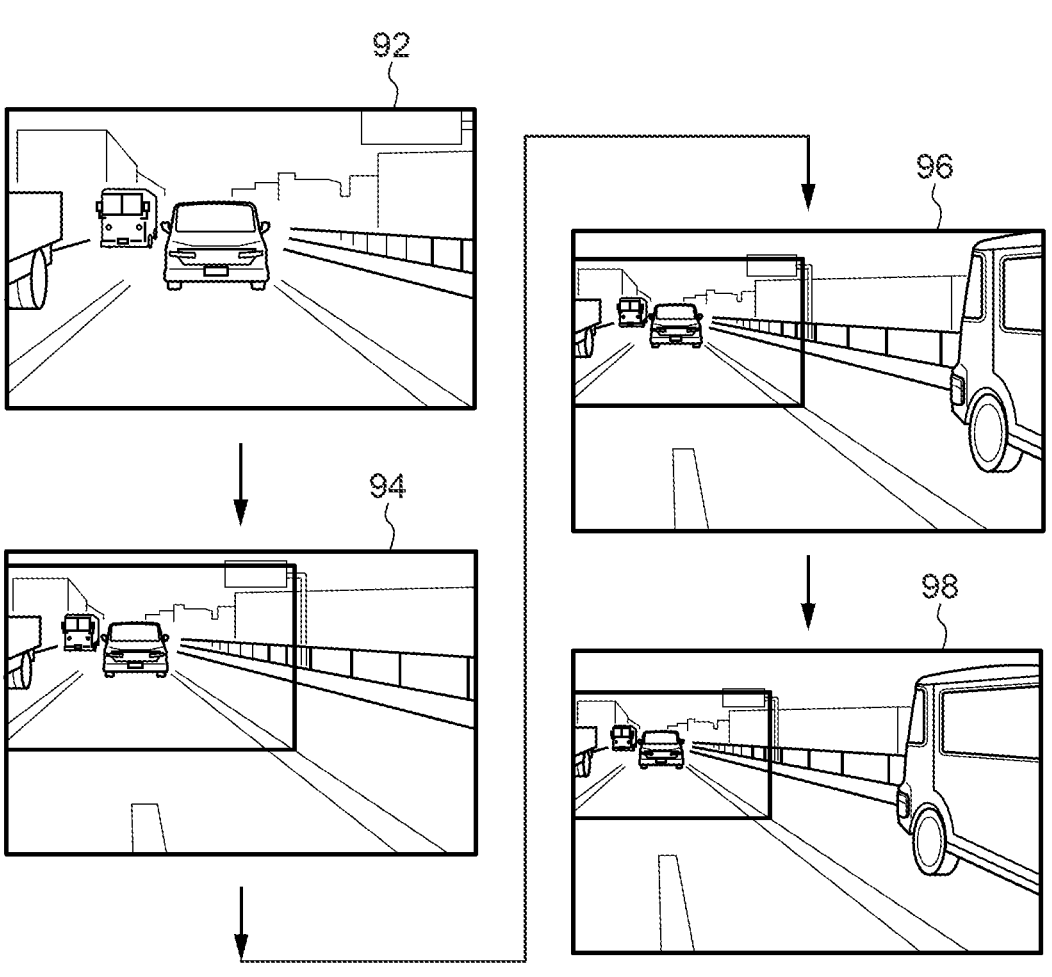
FIG. 14B is a schematic diagram showing image being switched in stages.

For example, as shown in FIG. 14A, the image display system enlarges in stages, in the order of an area 82, an area 84, an area 86, and an area 88, the area cut out from a captured image 80. In accompaniment with this, as shown in FIG. 14B, the magnification of the image displayed on the display device 14 becomes smaller in stages in the order of an image 92, an image 94, an image 96, and an image 98. By sequentially displaying these images, the magnification of the image displayed on the display device 14 appears to continuously change as when a camera zooms out.

According to the image display system pertaining to the fourth embodiment, in addition to the same advantageous effects as those of the first embodiment being obtained, it becomes easy for the rider to perceive changes in the image, and it becomes easy to maintain a sense of the distance to the following vehicle and a sense of the size of the following vehicle.

EXAMPLE MODIFICATIONS

It will be noted that the configurations of the image display system described in each of the above embodiments are examples, and it goes without saying that those configurations may be changed without departing from the spirit of the disclosure.

In the first embodiment, an example was described where the image display system displays the wide range image of the area directly behind the motorcycle, but the image display system may be configured to display the wide range image in which the turn side is wide, for example, as a result of the operation device 18 (i.e., the dedicated switch) being operated.

In the third embodiment, the image display system is configured to switch screens in conjunction with an operation of the turn switch, but the image display system may be configured to switch screens in conjunction with detection results of various sensors. Examples of the various sensors include a blind spot monitor (BSM) that detects the approach of a vehicle from behind the host vehicle, a sensor that detects inclination of the vehicle, and a vehicle speed sensor. For example, the image display system may be configured to switch screens in response to a warning from the BSM.

In the above embodiments, as shown in FIG. 8, the image display system causes the screens to transition so as to form a loop in the order of the initial screen 70, the screen 72 that displays the standard image 71, the screen 74 that displays the wide range image 73, and the initial screen 70. However, the image display system may also cause the screens to transition reciprocally in the order of the initial screen 70, the screen 72 that displays the standard image 71, the screen 74 that displays the wide range image 73, the screen 72 that displays the standard image 71, and the initial screen 70.

In the above embodiments, an example was described where the display device is installed in the meter display of the instrument panel, but it suffices for the display device to be installed in a position in front of a rider in which it is easy for the rider to see it, regardless of whether a meter display is present or not. For example, the display device may be installed on the handle, the part where the mirrors are attached, the upper portion of the fuel tank, inside the cowl, or on the upper side of the meter display.

In the above embodiments, an example was described where the image display system is provided with a dedicated display device, but a mobile information processing device such as a smartphone or a tablet may be used as the display device. In this case, the mobile information processing device uses a dedicated application program installed therein to execute various processes by cooperating with the ECU that is the control device. For example, a smartphone may be wirelessly connected by Bluetooth® to the communication unit 22, and image based on the image data stored in the storage unit 24 can be displayed on the screen of the smartphone (see FIG. 3).

What is claimed is:

1. An image display system, comprising:
an image capture device that captures an image of an area behind a motorcycle;
a display device that is disposed in front of a rider and displays an image based on image data obtained by the image capture device; and
a control device which, when the motorcycle is travelling, controls the display device so as to display either a first screen that displays a first image comprising a first area extracted from an imaging range of the image captured by the image capture device or a second screen that displays a second image comprising a second area, wider than the first area, extracted from the imaging range,
wherein, when displaying the second screen in response to an instruction from the rider, the control device controls the display device so as to display the first screen before displaying the second screen, thereby causing a transition from the first screen to the second screen.

2. The image display system of claim 1, wherein a first magnification at which the first image is displayed is closer to a magnification of a rearview optical mirror than a second magnification at which the second image is displayed.

3. The image display system of claim 1, wherein the control device controls the display device so as to display an initial screen and, thereafter, transition from the initial screen to the first screen, and controls the display device so as to transition from the second screen to the initial screen.

4. The image display system of claim 3, further comprising an operation device that receives the instruction to switch screens from the rider,
wherein the control device controls the display device such that at least one of a transition from the initial screen to the first screen, a transition from the first screen to the second screen, and a transition from the second screen to the initial screen is effected in response to the instruction from the rider via the operation device.

5. The image display system of claim 4, wherein:
the operation device is a switch configured to be subjected to long pressing, and
the control device controls the display device such that a transition from the initial screen to the first screen and a transition from the first screen to the second screen are continuously effected in response to a long pressing operation of the switch.

6. The image display system of claim 4, wherein:
the operation device is a switch that instructs switching to the second screen, and
the control device controls the display device such that a transition from the initial screen to the first screen and a transition from the first screen to the second screen are continuously effected in response to an operation of the switch.

7. The image display system of claim 3, wherein the control device controls the display device such that at least one of a transition from the initial screen to the first screen or a transition from the first screen to the second screen is effected in conjunction with an operation of a turn switch installed in the motorcycle.

8. The image display system of claim 7, wherein the second area has a range that is wider on a turn side than the first area.

9. The image display system of claim 7, wherein the control device controls the display device such that a transition from the initial screen to the first screen and a transition from the first screen to the second screen are continuously effected in response to a long pressing operation of the turn switch.

10. The image display system of claim 7, wherein the control device controls the display device such that a transition from the initial screen to the first screen and a transition from the first screen to the second screen are continuously effected in conjunction with a one-time operation of the turn switch.

11. The image display system of claim 1, wherein the control device controls the display device so as to transition from the first screen to the second screen via at least one third screen, which displays a third image comprising a third area, which is wider than the first area and narrower than the second area, extracted from the imaging range of the image captured by the image capture device,
wherein during the transition from the first screen to the second screen, the magnification of the image displayed on each screen is gradually increased such that the first image continuously changes to the second image.

12. A control device for controlling a display device so as to display images obtained by an image capture device that captures an image of an area behind a motorcycle, the device comprising a memory and a processor coupled to the memory, the processor being configured to:
when displaying a second screen in response to an instruction from a rider, display a first screen that displays a first image comprising a first area extracted from an imaging range of the image captured by the image capture device, before displaying the second screen, and
effect transition of a display screen of the display device from the first screen to the second screen that displays a second image comprising a second area, wider than the first area, extracted from the imaging range.

* * * * *